United States Patent [19]

Erker

[11] 4,320,819
[45] Mar. 23, 1982

[54] SEAT-OPERATED BRAKE ASSEMBLY WITH BRAKE PROTECTION MEANS

[75] Inventor: James W. Erker, Mentor, Ohio

[73] Assignee: Towmotor Corporation, Mentor, Ohio

[21] Appl. No.: 189,959

[22] PCT Filed: Mar. 6, 1980

[86] PCT No.: PCT/US80/00243
§ 371 Date: Mar. 6, 1980
§ 102(e) Date: Mar. 6, 1980

[87] PCT Pub. No.: WO81/02551
PCT Pub. Date: Sep. 17, 1981

[51] Int. Cl.³ .......................... B60T 7/12; F16D 65/30
[52] U.S. Cl. ...................................... 188/109; 180/273
[58] Field of Search ................ 180/273; 188/109, 167, 188/174

[56] References Cited

U.S. PATENT DOCUMENTS

| 3,664,453 | 5/1972 | Cottrell et al. | 188/109 X |
| 3,749,207 | 7/1973 | Meyer et al. | 188/109 |
| 3,892,294 | 7/1975 | Nieminski | 188/109 |

FOREIGN PATENT DOCUMENTS 686301  5/1964 Canada ............................. 188/109

Primary Examiner—Duane A. Reger
Attorney, Agent, or Firm—Phillips, Moore, Weissenberger, Lempio & Majestic

[57] ABSTRACT

A seat operated parking brake assembly for lift trucks and the like normally imposes an overload force on a caliper-type brake thereof, after the brake has been engaged. The present invention provides an arrangement (34 or 34') for maintaining a brake (20) of this type in its disengaged condition when a seat (11) is maintained in a first position under the weight of an operator and for isolating continued movement of the seat (11) from the brake (20), after the brake (20) has been engaged in response to initial movement of the seat (11).

11 Claims, 5 Drawing Figures

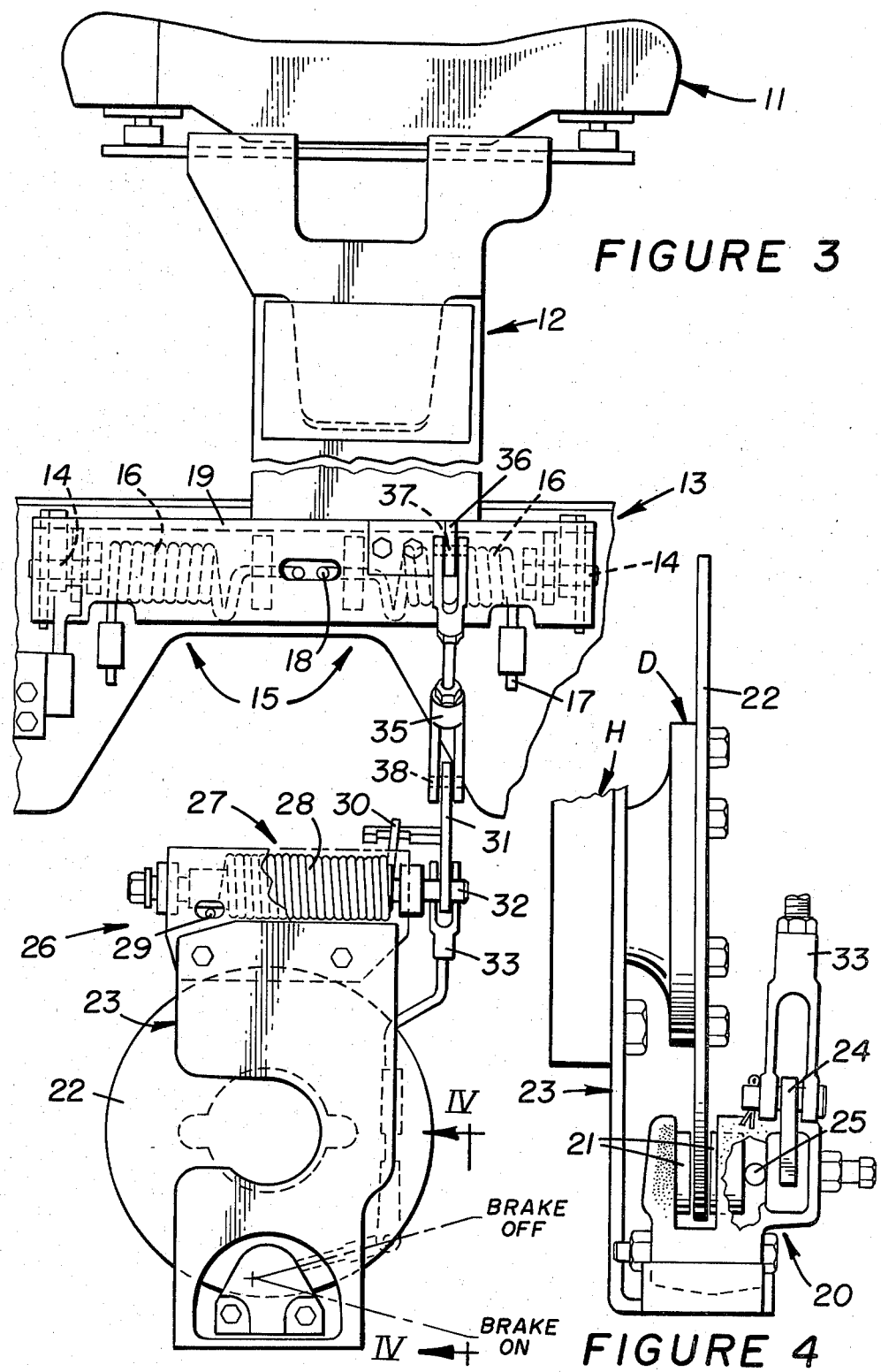

SEAT-OPERATED BRAKE ASSEMBLY WITH BRAKE PROTECTION MEANS

DESCRIPTION

Technical Field

This invention relates generally to a seat-operated brake assembly and more particularly to means for isolating movement of the seat from the brake after the brake has been engaged.

Background Art

Seat-operated brake assemblies are well-known in the art. In particular, when an operator of a vehicle is seated, a caliper-type parking brake is disengaged automatically through solid control linkages interconnected between the seat and the brake. When the operator leaves the seat, a heavy-duty torsion spring pivots the seat forwardly to engage the brake automatically through the solid linkage.

Continued forward movement of the seat after the brake has been engaged exerts an overload force on the caliper brake. Prolonged imposition of such force on the brake will tend to reduce the expected service life thereof. Although various solutions to this problem have been proposed, such as the employment of heavy-duty brake components, such proposals are generally uneconomical and do not always function to alleviate the wear problem.

The present invention is directed to overcoming one of more of the problems as set forth above.

Disclosure of Invention

In one aspect of the present invention, a seat-operated brake assembly includes a seat movable between first and second positions, a brake, and means for disengaging the brake when the seat is in its first position and for engaging the brake in response to movement of the seat towards its second position. The improvement therein comprises means for maintaining the brake in its disengaged condition through a solid linkage connection when the seat is in its first position, and for isolating movement of the seat from the brake by breaking the solid linkage connection after the brake has been engaged.

The improved brake assembly of this invention thus solves the prior art problem of imposing an overload force on the brake and to prolong the service life thereof. The brake assembly of this invention is also adapted for expeditious conversion to a hand-actuated brake assembly.

BRIEF DESCRIPTION OF THE DRAWINGS

Other advantages and objects of this invention will become apparent from the following description and accompanying drawings wherein:

FIG. 3 is a partially sectioned, front elevational view of the seat-operated brake assembly, taken in the direction of the arrows III—III in FIG. 1;

FIG. 4 is an enlarged and partially sectioned view of a caliper-type brake employed in the seat-operated brake assembly.

BEST MODE OF CARRYING OUT THE INVENTION

Figure 1:
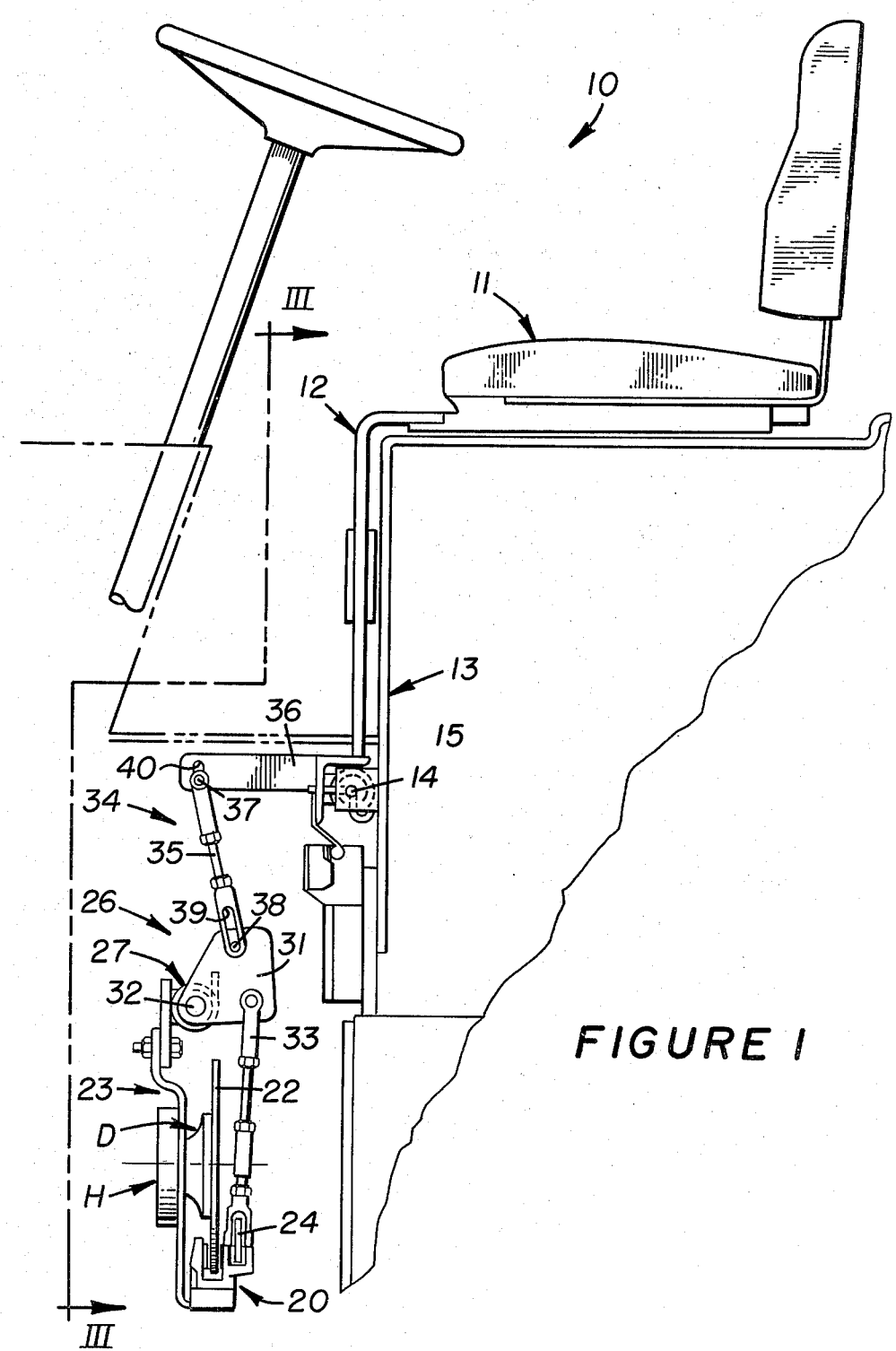
FIG. 1 is a side elevational view of a seat-operated brake assembly embodiment of this invention, shown in its brake released condition of operation.

FIG. 1 illustrates a seat-operated brake assembly 10, including a seat 11 secured on a frame assembly 12. Frame assembly 12 is pivotally mounted on a main frame structure 13 of a vehicle by a pair of laterally spaced pivot pins 14 (FIG. 3). When an operator mounts seat 11, his weight will retain it in its FIG. 1 first or brake-released position. When the operator leaves the seat, the seat will pivot automatically through a brake-engaged position 11' and to a second position 11" in FIG. 2, under the force of a first spring means 15.

As shown in FIG. 3, spring means 15 may take the form of a pair of torsion springs 16, each having a first end 17 thereof anchored to vehicle frame structure 13 and a second end 18 thereof anchored to an angle bar 19 of seat frame assembly 12. As described more fully hereinafter, when seat 11 is in its first position illustrated in FIG. 1, a standard caliper-type parking brake assembly 20 will be retained in its disengaged condition of operation due to the release of a pair of brake pads 21 from either side of a rotatable disc 22 thereof. Disc 22 is suitably mounted to an input flange of a standard drive line differential D. Brake assembly 20 is mounted on a bracket assembly 23, secured on a differential housing H and is adapted to be actuated upon pivotal movement of a brake lever 24.

Figures 2, 5:
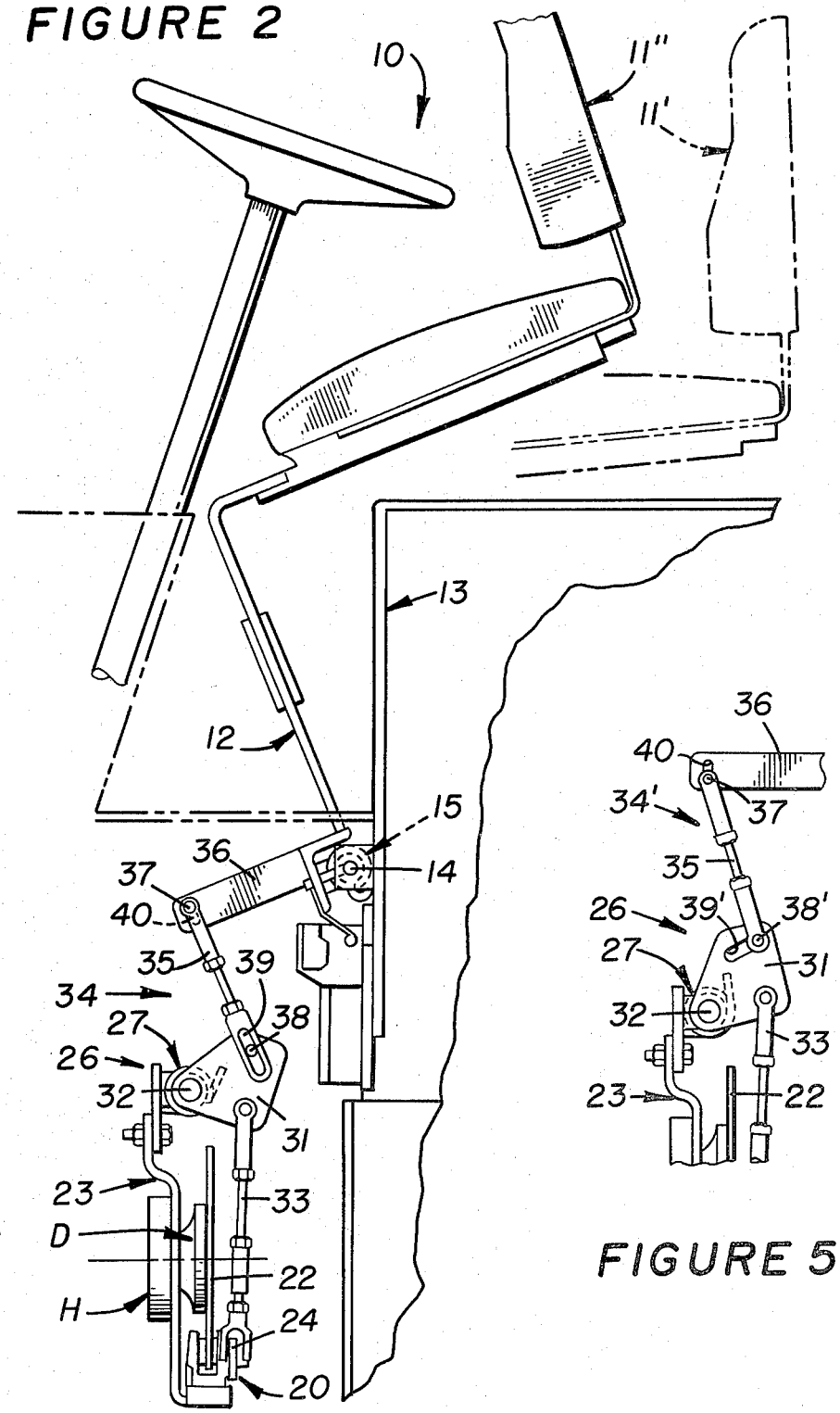
FIG. 2 is a view similar to FIG. 1, but showing the seat-operated brake assembly in a brake engaged condition of operation with a seat thereof pivoted forwardly upon removal of an operator therefrom.
FIG. 5 is a partial view, similar to FIG. 1, but illustrating a modification of the seat-operated brake assembly.

As shown in FIGS. 2 and 4, downward pivoting of brake lever 24 will function to engage a cam member 25 against the rightward brake pad 21 to move the pad leftwardly to engage it with disc 22 to compress the pads against the disc for brake engagement purposes. Since this type of brake assembly is conventional, further description thereof is deemed unnecessary.

Actuation of brake assembly 20 is controlled by an actuating means 26 for disengaging the brake assembly when seat 11 is in its FIG. 1 first position, and for engaging the brake assembly at intermediate seat position 11' in response to movement of the seat from such first position towards its FIG. 2 second position 11". Actuating means 26 includes a second spring means 27, shown in the form of a torsion spring 28 (FIG. 3) having a first end 29 thereof anchored to bracket assembly 23 and a second end 30 thereof anchored to a brake lever 31.

Brake lever 31 is pivotally mounted on bracket 23 by a pin 32 and an adjustable brake link 33 is pivotally interconnected between levers 24 and 31. Thus, torsion spring 28 will function to pivot lever 31, when released, clockwise in FIG. 2 to move link 33 downwardly to engage brake assembly 20.

A means 34 is provided in seat-operated brake assembly 10 for maintaining brake assembly 20 in its disengaged position when seat 11 is in its first position (FIG. 1) and for isolating movement of the seat from the brake assembly after the brake has been engaged at intermediate seat position 11' and the seat continues to move to second position 11". Means 34 includes a second adjustable link 35 pivotally interconnected between a lever arm 36 secured to frame assembly 12 and brake lever 31 by pivot pins 37 and 38, respectively. Means 34 further includes a first lost motion slot 39, formed through link 35, and a second lost motion slot 40, formed through lever arm 36.

It can be seen in FIG. 1 that when seat 11 is retained in its first position by the weight of the operator seated thereon, pivot pin 37 will bottom-out in slot 40 and pivot pin 38 will bottom-out in the lower end of slot 39. Thus, a solid linkage connection will be provided from lever arm 36 to link 33 to raise lever 24 to disengage brake assembly 20. When the operator leaves seat 11, springs 16 (FIG. 3) will automatically pivot seat 11 towards its second position, illustrated in FIG. 2. After the seat has moved past intermediate position 11′, pins 37 and 38 will "float" in slots 39 and 40, respectively, to permit brake spring 28 to pivot brake lever 31 clockwise in FIG. 2, to, in turn, depress link 33 to pivot lever 24 downwardly to engage brake assembly 20.

After engagement of brake assembly 20, continued movement of seat 11 from its 11′ to its 11″ position will be isolated from brake assembly 20 due to the lost motion connection provided at slots 39 and 40. Such isolation will prevent any imposition of an overload force on caliber brake assembly 20 to prolong the service life thereof.

FIG. 5 illustrates a modified means 34′ wherein a slot 39′ is formed through brake lever 31 rather than through link 35 and a pin 38′ is secured to the link to engage the slot. The lost-motion connection thus provided by pin 38′ and slot 39′ will function substantially the same as above-described connection 38, 39. Also, if so desired the arrangement of the lost-motion connection comprising pin 37 and slot 40 could be reversed, i.e., pin 37 secured to arm 36 and slot 40 formed through the upper end of link 35.

Industrial Applicability

Seat-operated brake assembly 10 is particularly useful on lift trucks and the like, requiring an operator to repeatedly remove himself from seat 11 to perform various job tasks. The seat-operated brake assembly will ensure automatic enagement of brake assembly 20 when the operator leaves seat 11. One desirable feature of seat-operated brake assembly 10 is that it may be easily converted to a hand-operated brake assembly by simply removing actuating means 26, links 33 and 35, and arm 36, and by connecting a standard hand-operated cable system (not shown) to brake assembly 20 for selective actuation thereof.

In operation, seating of the operator on seat 11 will maintain lever arm 36 in its raised position shown in FIG. 1 to, in turn, pivot brake lever 24 upwardly via link 35, lever 31, and link 33, to disengage brake assembly 20. As noted above, link 35 will form a solid linkage connection between lever arm 36 and lever 31.

When the operator leaves seat 11, initial forward pivoting of seat 11 to its 11′ position will permit lever 31 to pivot clockwise to engage brake assembly 20 automatically under the force of brake spring 28. As described above, further forward motion of seat 11 to its 11″ position is isolated from brake assembly 20 due to the lost motion provided by slot 39 or 39′ and slot 40.

Other aspects, objects, and advantages of this invention can be obtained from a study of the drawings, the disclosure, and the appended claims.

I claim:

1. In a seat-operated brake assembly (10) having a seat (11) movable between first and second positions, a brake assembly (20), an actuating means (26) for disengaging said brake assembly (20) when said seat (11) is at its first position and for engaging said brake assembly (20) in response to said seat (11) being at its second position the improvement comprising
   means (34 or 34′) for maintaining said brake assembly (20) in its disengaged condition through a solid linkage connection when said seat (11) is at its first position and for isolating movement of said seat (11) from said brake assembly by breaking said solid linkage connection (20) after engagement of said brake assembly (20).

2. The seat-operated brake assembly (10) of claim 1 wherein said seat (11) is mounted on a frame assembly (12) and wherein said means (34 or 34′) includes a link (35) pivotally interconnected between said frame assembly (12) and said actuating means (26).

3. The seat-operated brake assembly (10) of claim 2 wherein said actuating means (26) includes a brake lever (31), said frame assembly (12) includes a lever arm (36), and a pair of pin and slot connections (37,40 and 38,39 or 38′,39′) pivotally interconnecting said link (35) between said brake lever (31) and said lever arm (36).

4. The seat-operated brake assembly (10) of claim 3 wherein said pin and slot connections include a slot (40) in said lever arm (36) and a pin (37) secured to said link (35) and disposed in said slot (40).

5. The seat-operated brake assembly (10) of claim 4 wherein said pin and slot connections further include a slot (39) in said link (35) and a pin (38) secured to said brake lever (31) and disposed in the last-mentioned slot (39).

6. The seat-operated brake assembly (10) of claim 4 wherein said pin and slot connections further include a slot (39′) in said brake lever (31) and a pin (38′) secured to said link (35) and disposed in said last-mentioned slot (39′).

7. The seat-operated brake assembly of claim 3 further including first spring means (15) for pivoting said frame assembly (12) and said seat (11) from said first position towards said second position, and wherein said actuating means (26) further includes second spring means (27) for pivoting said brake lever (31) to engage said brake assembly (20) in response to movement of said seat (11) from its first position towards its second position.

8. A seat-operated brake assembly (10) comprising
   a seat (11) mounted on a frame assembly (12) to be pivotally moved from a first position to a second position,
   a caliper parking brake assembly (20) fixed about a rotatable disc (22) and at least one brake pad (21) disposed adjacent to said disc (22),
   brake actuating means (26) for disengaging said brake assembly (20) when said seat (11) is at its first position and for engaging said brake assembly (20) when said seat (11) is at its second position, said brake actuating means (26) including a torsion spring (28), a pivoted brake lever (31), and a first link (33) pivotally interconnected between said brake lever (31) and said brake assembly (20), and
   means (34 or 34′) for maintaining said brake assembly (20) in its disengaged position at said first position of said seat (11) and for isolating movement of said seat (11) from said brake assembly (20) when said brake assembly (20) is engaged, said means (34 or 34′) including a second link (35) and a pair of pin and slot connections (37,40 and 38,39 or 38′,39′) pivotally interconnecting said second link (35) between said frame assembly (12) and said brake lever (31).

9. The seat-operated brake assembly (10) of claim 8 wherein said pin and slot connections include a slot (39) in said second link (35) and a pin (38) secured to said brake lever (31) and disposed in said slot (39).

10. The seat-operated brake assembly (10) of claim 8 wherein said pin and slot connections include a slot (39') in said brake lever (31) and a pin (38') secured to said second link (35) and disposed in said slot (39').

11. In a seat-operated brake assembly (10) having a seat (11) mounted on a frame assembly (12) movable between first and second positions, said frame (12) including a lever arm (36), a brake assembly (20), an actuating means (26) for disengaging said brake assembly (20) when said seat (11) is at its first position and for engaging said brake assembly (20) in response to said seat (11) being at its second position, said actuating means (26) including a brake lever (31), means (34 or 34') for maintaining said brake assembly (20) in its disengaged condition when said seat (11) is at its first position and for isolating movement of said seat (11) from said brake assembly (20) after engagement of said brake assembly (20), including a link (35) pivotally interconnected between said frame assembly (12) and said actuating means (26) and a pair of pin and slot connections (37,40 and 38,39 or 38',39') pivotally interconnecting said link (35) between said brake lever (31) and said lever arm (36).

* * * * *